United States Patent
Jang et al.

(10) Patent No.: US 10,146,243 B2
(45) Date of Patent: Dec. 4, 2018

(54) METHOD AND SYSTEM OF CONTROLLING POWER FACTOR CORRECTION CIRCUIT

(71) Applicant: Hyundai Motor Company, Seoul (KR)

(72) Inventors: Hui Sung Jang, Gyeonggi-do (KR); Hyung Bin Ihm, Seoul (KR); Gi Bong Son, Gyeonggi-do (KR); Hyun Wook Seong, Gyeonggi-do (KR); Gyu Tae Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/352,124

(22) Filed: Nov. 15, 2016

(65) Prior Publication Data

US 2018/0011508 A1    Jan. 11, 2018

(30) Foreign Application Priority Data

Jul. 8, 2016  (KR) .................. 10-2016-0086901

(51) Int. Cl.
*H02M 1/42*   (2007.01)
*G05F 1/70*   (2006.01)
*B60L 11/18*  (2006.01)

(52) U.S. Cl.
CPC ............ *G05F 1/70* (2013.01); *B60L 11/1809* (2013.01)

(58) Field of Classification Search
CPC .. H02M 3/157; H02M 1/4208; H02M 1/4225; H02M 1/4241; H02M 2001/4291; H02M 1/4258; G05F 1/70
See application file for complete search history.

(56) References Cited

U.S. PATENT DOCUMENTS

| 9,577,514 B2* | 2/2017 | Wang ................. H02M 1/4258 |
| 2016/0065054 A1* | 3/2016 | Li ....................... H02M 1/4225 363/89 |

FOREIGN PATENT DOCUMENTS

| JP | H09130972 A | 5/1997 |
| JP | 2007-215378 A | 8/2007 |
| JP | 2013-180716 A | 9/2013 |
| JP | 2016-025668 A | 2/2016 |
| KR | 10-0133546 B1 | 4/1998 |
| KR | 2003-0000538 A | 1/2003 |
| KR | 10-1464483 B1 | 11/2014 |

* cited by examiner

*Primary Examiner* — Gary L Laxton
(74) *Attorney, Agent, or Firm* — Mintz Levin Cohn Ferris Glovsky and Popeo, P.C.; Peter F. Corless

(57) ABSTRACT

A method for controlling a power factor correction circuit includes: sensing, by a control unit, an input signal; deriving, by the control unit, a delay correction input signal using the input signal and a previous input signal that is sensed before the input signal; and controlling, by the control unit, the power factor correction circuit using the derived delay correction input signal.

8 Claims, 4 Drawing Sheets

METHOD AND SYSTEM OF CONTROLLING POWER FACTOR CORRECTION CIRCUIT

CROSS REFERENCE TO RELATED APPLICATION

The present application claims priority to and the benefit of Korean Patent Application No. 10-2016-0086901 filed on Jul. 8, 2016, the entire contents of which are incorporated by reference as if fully set forth herein.

BACKGROUND OF THE DISCLOSURE

Technical Field

The present disclosure relates, in general, to a method of controlling a power factor correction circuit and, more particularly, to a method of controlling a power factor correction circuit that is a device mainly used in a charging device, or the like.

Description of the Related Art

As automobiles running on gasoline and diesel have developed, so too has air pollution accelerated due to vehicle emissions. To cope with the air pollution, many people have purchased eco-friendly cars which limit emissions. As such, many car makers throughout the world have commenced in the development of eco-friendly cars.

Eco-friendly cars typically include hybrid cars, plug-in hybrid cars, electric cars, fuel cell cars, and the like. Among those, the electric car does not use oil fuel and an engine, but instead uses an electric battery and an electric motor. The electric car is driven by rotating the electric motor with electricity charged in the battery. To expand the use of electric cars, it has been necessary to construct a charging infrastructure. Additionally, it has been necessary develop a charging stand that acts as a power transfer device and a charging system.

Therefore, charging systems which include an on-board slow charger for the electric car have been researched. The slow charger includes a power factor correction (PFC) circuit for decreasing reactive power. The power factor correction circuit serves to increase a power factor defined as an amount of effective power among apparent power by decreasing the reactive power. For this purpose, a topology control of the power factor correction circuit plays a very important role in the use of the electric car.

The contents described as the related art have been provided only for assisting in the understanding for the background of the present disclosure and should not be considered as corresponding to the related art known to those skilled in the art.

SUMMARY OF THE DISCLOSURE

Accordingly, the present disclosure proposes a method and system for controlling a power factor correction circuit having improved efficiency by decreasing reactive power of the power factor correction circuit and increasing an amount of effective power to improve charging efficiency of a charger for a vehicle.

In order to achieve the above object, according to embodiments of the present disclosure, there is provided a method of controlling a power factor correction circuit including: sensing, by a control unit, an input signal; deriving, by the control unit, a delay correction input signal using the input signal and a previous input signal that is sensed before the input signal; and controlling, by the control unit, the power factor correction circuit using the derived delay correction input signal.

The method may further include: sampling, by the control unit, the input signal after the sensing of the input signal. The deriving of the delay correction input signal may include: extracting, by the control unit, a sampled first signal and a second signal that is sampled before the first signal; deriving, by the control unit, a signal correction value using a difference between the first signal and the second signal; and deriving, by the control unit, the delay correction input signal by adding the derived signal correction value to the first signal.

The deriving of the signal correction value may further include deriving, by the control unit, the signal correction value by multiplying a value, which is obtained by subtracting the second signal from the first signal, by a conversion constant.

The value obtained by subtracting the second signal from the first signal may increase as the conversion constant increases.

The deriving of the delay correction input signal may include: deriving, by the control unit, the delay correction input signal using the following equation, $$S_c[k]=k_p*(S[k]-S[k-n]),$$

whereby $S_c[k]$ is a $k^{th}$ delay correction input signal, $k_p$: is a conversion constant, $S[k]$ is a $k^{th}$ sampled input signal, and $S[k-n]$ is a $(k-n)^{th}$ sampled input signal The input signal may be an input voltage applied to the power factor correction circuit, and the controlling of the power factor correction circuit may include controlling, by the control unit, the power factor correction circuit by applying a delay correction input voltage derived using the input voltage to an output terminal of a voltage controller of the power factor correction circuit.

The controlling of the power factor correction circuit may include feedforward correcting, by the control unit, an output value of the current controller by applying the delay correction input voltage to an output terminal of a current controller that is connected to the output terminal of the voltage controller.

Furthermore, according to embodiments of the present disclosure, there is provided a system of a power factor correction circuit configured to improve a power factor of an input signal including: a control unit configured to sense the input signal, derive a delay correction input signal using the input signal and a previous input signal that is sensed before the input signal, and control the power factor correction circuit using the derived delay correction input signal.

The control unit may be further configured to sample the input signal, extract a sampled first signal and a second signal that is sampled before the first signal, derive a signal correction value by multiplying a value, which is obtained by subtracting the second signal from the first signal, by a conversion constant, and derive the delay correction input signal by adding the signal correction value to the first signal.

The power factor correction circuit may include a voltage controller and a current controller that minimize an error of a signal input to the power factor correction circuit, and the control unit may be further configured to control the power factor correction circuit by applying the delay correction input signal to an output terminal of the voltage controller or an output terminal of the current controller.

Accordingly, the power factor correction circuit of the present disclosure may decrease the reactive power and increase the effective power without the increase in costs, thereby improving power transfer efficiency. Further, the power factor correction circuit of the present disclosure may be used in the charger to improve the power transfer efficiency, thereby shortening the charging time and saving costs consumed for charging.

BRIEF DESCRIPTION OF THE DRAWINGS

The above and other objects, features and advantages of the present disclosure will be more clearly understood from the following detailed description taken in conjunction with the accompanying drawings, in which.

Figure 1:
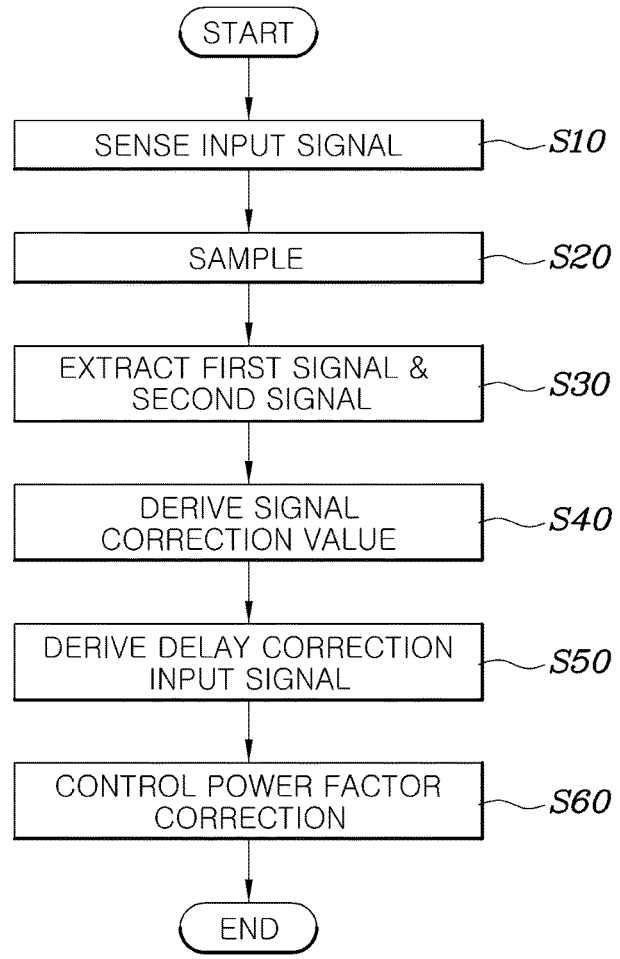
FIG. 1 is a flow chart of a method of controlling a power factor correction circuit according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, exemplary embodiments of the present disclosure will be described with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Referring now to the disclosed embodiments, as illustrated in FIG. 1, a method of controlling a power factor correction circuit 10 according to an exemplary embodiment of the present disclosure includes an input signal sensing step (S10) of sensing, by a control unit 20, an input signal and a sampling step (S20) of sampling, by the control unit 20, the input signal. In the input signal sensing step (S10), the input signal may mean a signal of an input voltage, an input current, or the like that is applied to the power factor correction circuit 10 and may also include various forms of analog signals applied to the power factor correction circuit 10.

The control unit 20 of the power factor correction circuit 10 senses the input signal applied to the power factor correction circuit 10 and converts the input signal into an appropriate value to control the power factor correction circuit 10, in which the converting is the sampling step (S20) illustrated in FIG. 1. The sampling step basically means a step of digitalizing the analog signal. Since most switch elements used in the power factor correction circuit 10 are operated based on a pulse width modulation (PWM) signal that may be considered to be a kind of digital signals, to smoothly operate the power factor correction circuit 10, the input signal applied to the power factor correction circuit 10 needs to be digitalized. Therefore, the present disclosure includes the step of sampling the input signal input to the power factor correction circuit 10.

After the sampling step (S20), according to the related art, the power factor correction circuit 10 will be controlled by using the sampled input signal. However, due to the steps previously performed to control the power factor correction circuit 10 (i.e., the input signal sensing step (S10) and the sampling step (S20)), the input signal applied to the power factor correction circuit 10 may be delayed. In particular, due to a delay factor of the control unit 20—the delay factor mainly occurring due to a filter, a CPU, or the like that is configured in the control unit 20—that performs the sampling in the sampling step (S20), the input signal may be delayed. Therefore, deterioration in response performance of the power factor correction circuit 10 due to the delay factor occurs (generally, the power factor correction circuit 10 is a device correcting a power factor of an AC power supply and deterioration in response performance remarkably occurs around zero crossing of an AC power supply), and as a result a total harmonic distortion (THD) of the power factor correction circuit 10 is also increased.

Therefore, according to embodiments of the present disclosure, in order to correct the delay factor, the power factor correction circuit 10 performs a step of deriving, by the control unit 20, a delay correction input signal of the input signal using the input signal and an input signal sensed prior to the input signal, prior to performing a power factor correction circuit controlling step (S60).

In detail, after the sampling step (S20), the control unit 20 performs a first signal & second signal extracting step (S30) of extracting a first signal sampled and a second signal sampled followed by the first signal. The first signal is a sampled input signal that is applied to the power factor correction circuit 10 and the second signal means an input signal sampled followed by the first signal. The present disclosure relates to a method of deriving a correction signal a delay of an input signal, and therefore derives the delay correction input signal using the input signal sampled followed by a signal currently sampled.

In the case of extracting the second signal in the present step, whether to extract a signal sampled before several cycles of the first signal as the second signal may come into question, which may be appropriately selected by a designer as needed. For example, when the sampling for one input signal is progressed by 100 cycles, if a signal sampled before 1 cycle of the first signal is extracted as the second signal, the delay factor of the input signal may be corrected at an interval of 1/100. Therefore, precision of the input signal delay correction may be improved, which leads to improve the power factor of the power factor correction circuit 10. In this case, however, the control unit 20 continuously derives the delay correction input signal for a short cycle and needs to apply the derived delay correction input signal to the power factor correction circuit 10, and therefore there is a problem in that the control unit 20 may encounter overload. Therefore, a designer needs to appropriately extract the second signal as needed.

After the first signal and the second signal are extracted, the control unit 20 performs a signal correction value deriving step (S40) of deriving a signal correction value using a difference between the first signal and the second signal. In detail, in the signal correction value deriving step, the signal correction value is derived by multiplying a value, which is obtained by subtracting the second signal from the first signal, by a conversion constant. The difference between the first signal and the second signal becomes a reference which may determine a delay time depending on the input signal sampling, and therefore the present disclosure is configured to subtract the second signal from the first signal to thereby obtain the signal correction value for deriving the delay correction input signal.

Further, the conversion constant is a constant value for reconverting the difference between the sampled first signal and second signal into a dimension of the input signal and may have various values depending on a size of the difference between the first signal and the second signal. However, as the difference between the first signal and the second signal increases, the correction value also increases due to the delay factor to be applied to the input signal. And as a result, as the value obtained by subtracting the second signal from the first signal increases, the size of the conversion constant also increases.

After the signal correction value deriving step (S40), as illustrated in FIG. 1, a delay correction input signal deriving step (S50) of deriving the delay correction input signal of the first signal by adding the signal correction value to the first signal is performed. Therefore, due to the above step, the first signal that is the input signal applied to the power factor correction circuit 10 has the input signal value in which the delay factor occurring due to the sampling step is corrected.

In addition, the delay correction input signal derived by the delay correction input signal deriving step (S50) may be represented by the following Equation:

$$S_c[k]=k_p*(S[k]-S[k-n])+S[k]$$

where $S_c[k]$ is a $k^{th}$ delay correction input signal, $k_p$ is a conversion constant, $S[k]$ is a $k^{th}$ sampled input signal, and $S[k-n]$ is a $(k-n)^{th}$ sampled input signal Finally, the control unit 20 performs the power factor correction circuit controlling step (S60) of controlling the power factor correction circuit 10 using the delay correction input signal derived by the above-mentioned method. In this case, to which portion of the power factor correction circuit 10 the delay correction input signal is applied may come into question.

Figure 3:
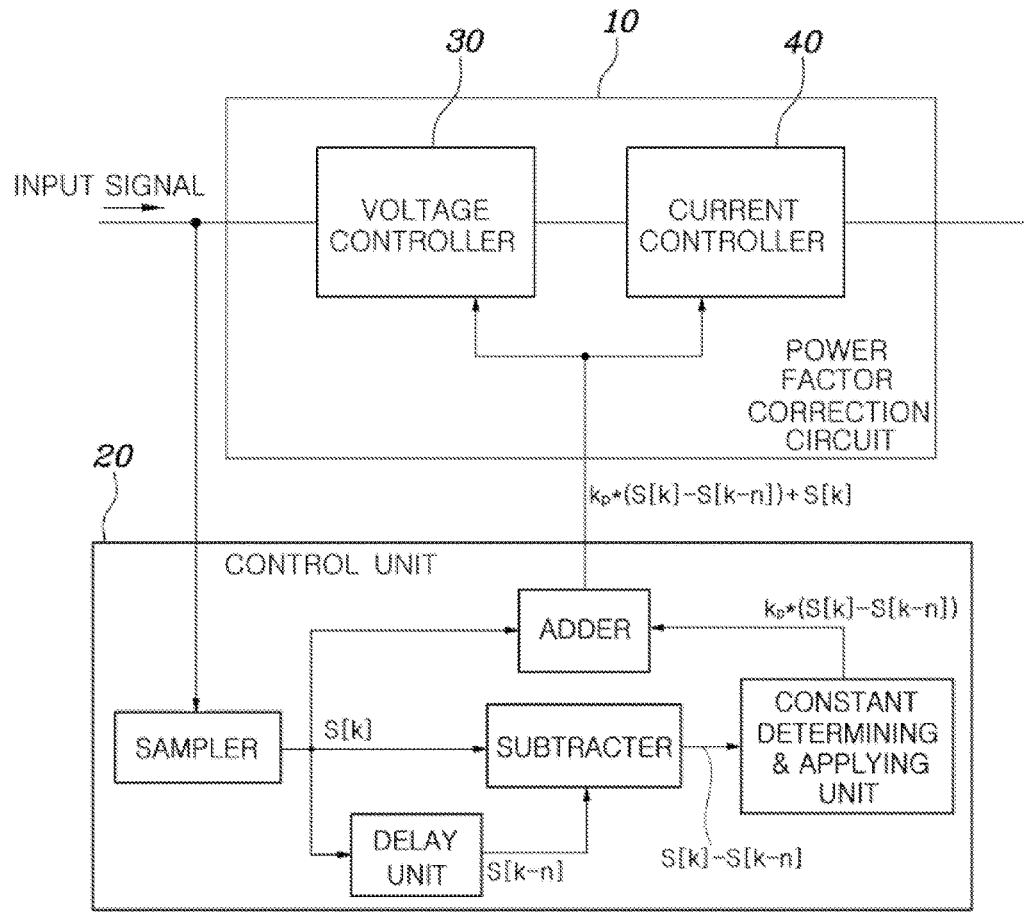
FIG. 3 is a configuration diagram of a power factor correction circuit system according to embodiments of the present disclosure.

As illustrated in FIG. 3, the power factor correction circuit 10 is generally configured to include a voltage controller 30 and a current controller 40. The voltage controller 30 and the current controller 40 generally use a PI controller that is used to minimize an error in the input signal input to the controllers.

Therefore, if the input signal described herein corresponds to an input voltage applied to the power factor correction circuit 10, the control unit 20 applies the delay correction input voltage, which is derived by using the input voltage, to an output terminal of the voltage controller 30 of the power factor correction circuit 10 to control the power factor correction circuit 10, thereby improving the power factor of the power factor correction circuit 10.

In addition to the method of applying the delay correction input voltage to the output terminal of the voltage controller 30, a method of feedforward correcting an output value of the current controller 40 by applying the delay correction input voltage to an output terminal of the current controller 40 that is connected to the output terminal of the voltage controller 30 may be considered.

Figure 2A:
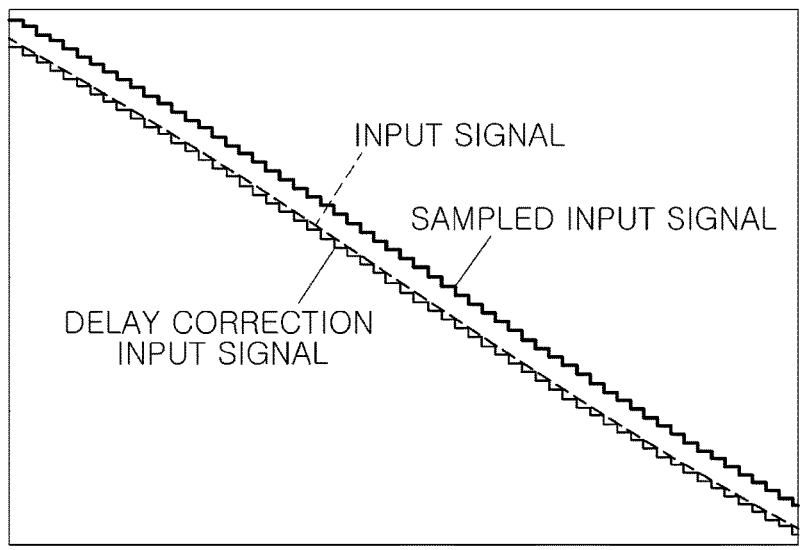
FIGS. 2A and 2B are comparative graphs of a delay factor correction effect of an input signal according to embodiments of the present disclosure.
Figure 2B:
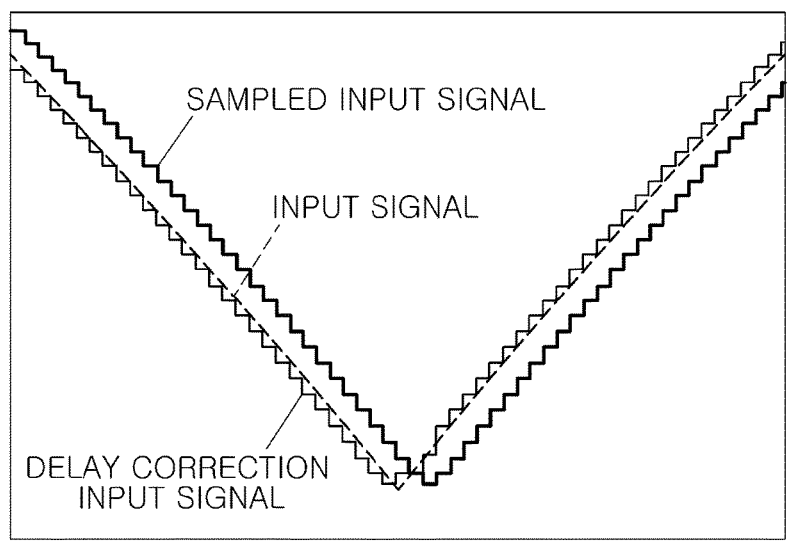

In FIGS. 2A and 2B, an actual input signal is compared with the delay correction input signal according to the present disclosure and the sampled input signal according to the related art. As illustrated in FIGS. 2A and 2B, it can be confirmed from the sampling result that the delay correction input signal and the sampled input signal both have a signal form that is discrete in a stepped shape, unlike the actual input signal. Here, it can be confirmed that in both cases of FIG. 2A showing the form in which the input signal is continuously decreased and in the case of FIG. 2B showing the form in which the input signal is decreased and then increased, the delay correction input signal follows the input signal without the large error as compared to the related art. Therefore, according to the present disclosure, the delay factor of the input signal occurring in the power factor correction circuit 10 may be minimized, and thus the power factor of the power factor correction circuit 10 may be improved.

Further, the method of correction a delay factor according to the present disclosure is restrictively applied only to the power factor correction circuit suggested in the present disclosure but may be used in various sensor elements and devices using the AC power supply and the present disclosure may also be applied even to a method of sensing a phase of a motor hall sensor element used to control an output of a motor.

Further, as illustrated in FIG. 3, the power factor correction circuit 10 according to embodiments of the present disclosure is configured to improve the power factor of the input signal. Furthermore, the control unit 20 is configured to sense the input signal, derive the delay correction input signal of the input signal using the input signal and the input signal sensed before the input signal, and control the power factor correction circuit 10 using the delay correction input signal, and the power factor correction circuit 10 includes the voltage controller 30 and the current controller 40 that may minimize the error of the signal input to the power factor correction circuit 10.

Although the present disclosure has been shown and described with respect to specific embodiments, it will be obvious to those skilled in the art that the present disclosure may be variously modified and altered without departing from the spirit and scope of the present disclosure as defined by the following claims.

What is claimed is:

1. A method for controlling a power factor correction circuit, the method comprising:
    sensing, by a control unit, a present input signal;
    deriving, by the control unit, a delay correction input signal using the present input signal and a previous input signal that is sensed before the present input signal;
    controlling, by the control unit, the power factor correction circuit using the derived delay correction input signal; and
    sampling, by the control unit, the input signal after the sensing of the input signal,
    wherein the deriving of the delay correction input signal comprises:
        extracting, by the control unit, a sampled first signal and a second signal that is sampled before the first signal;
        deriving, by the control unit, a signal correction value using a difference between the first signal and the second signal; and
        deriving, by the control unit, the delay correction input signal by adding the derived signal correction value to the first signal.

2. The method of claim 1, wherein the deriving of the signal correction value comprises:
    deriving, by the control unit, the signal correction value by multiplying a value, which is obtained by subtracting the second signal from the first signal, by a conversion constant.

3. The method of claim 2, wherein the value obtained by subtracting the second signal from the first signal increases as the conversion constant increases.

4. The method of claim 1, wherein the deriving of the delay correction input signal comprises:
    deriving, by the control unit, the delay correction input signal using the following equation:

$$S_c[k]=k_p*(S[k]-S[k-n])+S[k]$$

wherein $S_c[k]$ is a $k^{th}$ delay correction input signal, $k_p$ is a conversion constant, $S[k]$ is a $k^{th}$ sampled input signal, and $S[k-n]$ is a $(k-n)^{th}$ sampled input signal.

5. The method of claim 1, wherein:
    the input signal is an input voltage applied to the power factor correction circuit, and
    the controlling of the power factor correction circuit comprises controlling, by the control unit, the power factor correction circuit by applying a delay correction input voltage derived using the input voltage to an output terminal of a voltage controller of the power factor correction circuit.

6. The method of claim 5, wherein the controlling of the power factor correction circuit comprises:
    feedforward correcting, by the control unit, an output value of a current controller by applying the delay correction input voltage to an output terminal of a current controller that is connected to the output terminal of the voltage controller.

7. A system for a power factor correction circuit configured to improve a power factor of an input signal, the system comprising:
    a control unit configured to sense a present input signal, derive a delay correction input signal using the present input signal and a previous input signal that is sensed before the present input signal, and control the power factor correction circuit using the derived delay correction input signal,
    wherein the control unit is further configured to sample the input signal, extract a sampled first signal and a second signal that is sampled before the first signal, derive a signal correction value by multiplying a value, which is obtained by subtracting the second signal from the first signal, by a conversion constant, and derive the delay correction input signal by adding the signal correction value to the first signal.

8. The system of claim 7, wherein:
    the power factor correction circuit includes a voltage controller and a current controller that minimize an error of a signal input to the power factor correction circuit, and the control unit is further configured to control the power factor correction circuit by applying the delay correction input signal to an output terminal of the voltage controller or an output terminal of the current controller.

* * * * *